(12) United States Patent
Okada et al.

(10) Patent No.: US 9,078,288 B2
(45) Date of Patent: Jul. 7, 2015

(54) INDEPENDENT INFORMATION NETWORK

(75) Inventors: Ted T Okada, Fairfax, VA (US); Paresh S Suthar, Austin, TX (US); Ming Liu, Redmond, WA (US); Jack E Ozzie, North Bend, WA (US); Matthew S Augustine, Seattle, WA (US); Raymond E Ozzie, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1071 days.

(21) Appl. No.: 12/427,027

(22) Filed: Apr. 21, 2009

(65) Prior Publication Data
US 2010/0265935 A1 Oct. 21, 2010

(51) Int. Cl.
*H04W 4/00* (2009.01)
*H04J 3/06* (2006.01)
*H04W 84/18* (2009.01)
*H04L 29/08* (2006.01)
*H04W 48/10* (2009.01)

(52) U.S. Cl.
CPC .............. *H04W 84/18* (2013.01); *H04W 48/10* (2013.01); *H04L 67/1095* (2013.01); *H04L 67/00* (2013.01)

(58) Field of Classification Search
USPC ........................................................ 370/350
See application file for complete search history.

(56) References Cited

U.S. PATENT DOCUMENTS

| | | | | |
|---|---|---|---|---|
| 6,021,433 | A * | 2/2000 | Payne et al. | 709/219 |
| 6,624,750 | B1 * | 9/2003 | Marman et al. | 340/506 |
| 2001/0038624 | A1 * | 11/2001 | Greenberg et al. | 370/352 |
| 2003/0125057 | A1 * | 7/2003 | Pesola | 455/502 |
| 2003/0207697 | A1 * | 11/2003 | Shpak | 455/524 |
| 2004/0158494 | A1 * | 8/2004 | Suthar | 705/15 |
| 2005/0203892 | A1 | 9/2005 | Wesley et al. | |
| 2006/0073812 | A1 * | 4/2006 | Punaganti Venkata et al. | 455/412.1 |
| 2006/0195882 | A1 * | 8/2006 | Tischer et al. | 725/116 |
| 2006/0225121 | A1 * | 10/2006 | Tischer et al. | 725/135 |
| 2007/0010261 | A1 | 1/2007 | Dravida et al. | |
| 2007/0124144 | A1 | 5/2007 | Johnson | |

(Continued)

OTHER PUBLICATIONS

Kanchanasut et al., "Building a Long-distance Multimedia Wireless Mesh Network for Collaborative Disaster Emergency Responses", Apr. 2007, http://www.interlab.ait.ac.th/dumbo/WMNForEmergencyResponses_AIT.pdf.

(Continued)

*Primary Examiner* — Noel Beharry
*Assistant Examiner* — Kodzovi Acolatse
(74) *Attorney, Agent, or Firm* — Dan Choi; Judy Yee; Micky Minhas

(57) ABSTRACT

A localized collaboration of wireless communication enabled devices can be provided for sharing of information that is independent of external communications. A local hub can communicate with a remote hub and end users using one or more wireless communication points, and provide for uploading and downloading of collaborative information from the local hub by an end user device. The local hub wirelessly broadcasts a message that has contact information that allows a remote hub to wirelessly retrieve collaborative information from the local hub. The local hub can synchronize collaborative information with a remote hub, if present, by retrieving a remote version of collaborative information using the remote hub's broadcast contact information; comparing the remote version with a locally stored version, if present; updating the local version with differences between the remote version if the remote version is a desired; and creating a local version if one is not present.

20 Claims, 9 Drawing Sheets

(56) References Cited

U.S. PATENT DOCUMENTS

| | | | | |
|---|---|---|---|---|
| 2007/0294366 | A1* | 12/2007 | Ozzie et al. | 709/217 |
| 2008/0095086 | A1* | 4/2008 | Linkola et al. | 370/310 |
| 2008/0320055 | A1 | 12/2008 | Sagar et al. | |
| 2009/0111485 | A1* | 4/2009 | Kitani | 455/456.1 |
| 2009/0190522 | A1* | 7/2009 | Horn et al. | 370/315 |
| 2009/0233623 | A1* | 9/2009 | Johnson | 455/456.3 |

OTHER PUBLICATIONS

"Perseus Wireless Network Node Family Perseus Winn-Mesh", Selex Communications, 2008, http://www.selex-comms.com/en/wp-content/uploads/2008/01/PERSEUS_WiNN_Mesh_EN_LR.pdf.

Akyildiz et al., "Wireless mesh networks: a survey", 2004, http://cial.csie.ncku.edu.tw/2006pdf/%5BY2005%5D%5BCN%5DWireless%20mesh%20networks%20a%20survey.pdf.

"An Introduction to Wireless Mesh Networking", Firetide, Inc., 2005, http://www.scansourcesecurity.com/MicroSites/ScanSourceSecurity/quickstart/docs/Firetide_intro_to_mesh.pdf.

Maltz, David, "The Dynamic Source Routing Protocol", 2003, http://www.cs.cmu.edu/~dmaltz/dsr.html.

"File Sharing", pp. 1-7, 2009, http://en.wikipedia.org/wiki/File_sharing.

"Skype", pp. 1-10, 2009, http://en.wikipedia.org/wiki/Skype.

Ross, Keith, "P2P File Sharing", http://www.ftc.gov/bcp/workshops/filesharing/presentations/ross.pdf.

Ross, et al., "Peer-to-Peer File-Sharing Technology", Dec. 15 & 16, 2004, http://www.ftc.gov/bcp/workshops/filesharing/index.htm.

* cited by examiner

INDEPENDENT INFORMATION NETWORK

BACKGROUND

Often, after natural disasters (and possibly man-made disasters) local infrastructure is impaired. For example, electrical power, telecommunications land-lines, and even mobile communications towers are damaged and unusable in some areas affected by the disaster. However, communications typically remains desirable for those that remain in the area by choice or happenstance. Emergency responders, families and friends may wish to find out who is still around after the disaster. Further, individuals that remain in a neighborhood may be able to mitigate problems if they organize and band together to support each other. Additionally, availability of desirable supplies and information may need to be communicated to those in the area. For at least these reasons, a reliable way to collaborate information may be desirable in an area that lacks sufficient local infrastructure.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A hurricane can wipe out electrical power, and virtually all other forms of communications in a large area. However, people often remain behind in their neighborhood for a variety of reasons. In order for those remaining individuals to communicate with each other, to organize, find people, and communicate vital information, a reliable collaboration network can be established. Because most people currently have wireless enabled computing devices, such as laptops, handheld devices, mobile smart phones, etc., a mesh-type network may be desirable to facilitate information collaboration in an area lacking proper infrastructure.

Currently, some solutions exist that allow for a local area network (LAN) to be created using radio nodes. These current systems rely on a central set of software and network services to provide some sort of federation. Further, while these nodes can be physically arranged in a type of mesh network in an area, they do not provide for ad-hoc type configuration and synchronization of collaborative information, instead needing to be physically booted and connected to respective nodes in a pre-arranged configuration and network setup.

As provided herein, techniques and systems that enable end user devices that are wirelessly enabled to communicate with each other in an area that lacks outside communication and power, by linking to independent hubs, and having the hubs synchronize user collaborated information with each other. For example, end users can connect to a local hub and upload (or download) information feeds (e.g. RSS or atom web-feeds). If a remote hub is within wireless communications range, the local hub can synchronize the feeds to the remote hub, whereby end users connected to the remote hub can download the feeds.

In one embodiment, a local independent information hub (hub) can communicate with one or more remote hubs and one or more end user devices using one or more local wireless communication points (e.g., WEP, WiMAX), for example, contained within the hub device. The local hub can provide for uploading and downloading of collaborative information from the local hub by an end user device, for example, using a web-server. Further, the local hub can wirelessly broadcasting a message that has contact information for the local hub (e.g., an IP address), and that allows a remote hub to wirelessly retrieve collaborative information (e.g., feeds) from the local hub. Additionally, the local hub can synchronize collaborative information with a remote hub, if present, by: wirelessly retrieving a remote version of feeds from the remote hub using the remote hub's broadcast contact information; comparing the remote version of the feed with a locally stored version, if present; updating the local version with differences between the remote version and the local version if the remote version is a desired version (e.g., preferred based on updates); and creating a local version if one is not present.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
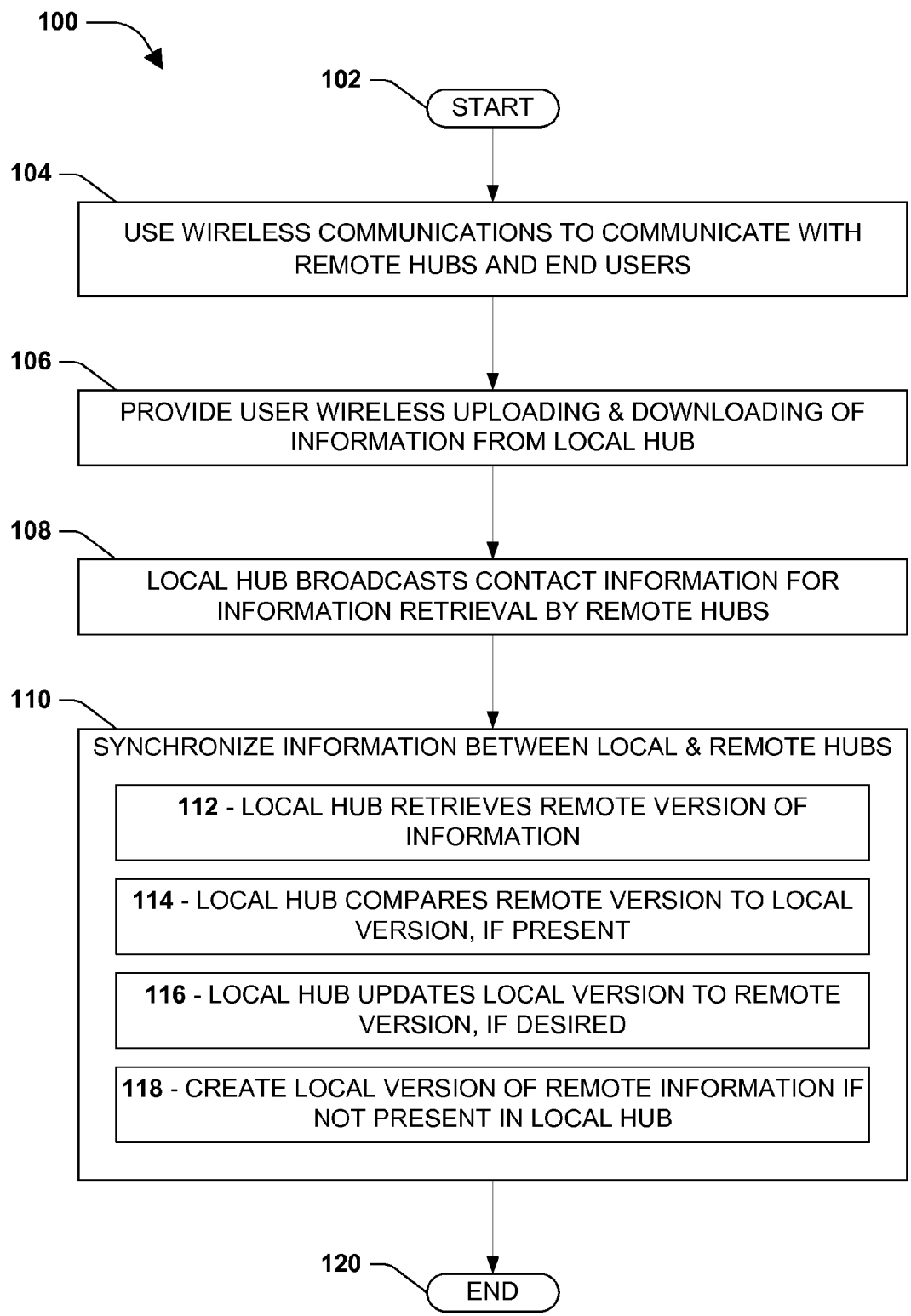
FIG. 1 is a flow chart diagram illustrating an exemplary method for providing a localized collaboration of wireless communication enabled devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised whereby local wireless devices can link to a hub device, and hub devices can further be linked together to create a localized information network for users of local wireless devices. For example, where communications infrastructure is lacking in a particular area (e.g., after a hurricane) self-powered collaborative information hubs, provided with wireless communications capability, can be spread throughout the area. In this example, end users having wireless communications enabled devices (e.g., WiFi enabled laptops, portable digital assistants, and phones) can link to a hub within range. A hub can also link with another hub in range, thereby creating a localized network for communications between end users, for example. FIG. 1 is a flow chart diagram illustrating an exemplary method 100 for providing a localized collaboration of wireless communication enabled devices, for sharing information.

The exemplary method 100 begins at 102 and involves a local independent information hub (hub) using one or more wireless communication points to communicate with one or more remote hubs, and to communicate with one or more end users, at 104. In one embodiment, as shown in the exemplary environment 500 of FIG. 5, a local hub 502 may comprise two wireless communications points 510 and 514. In this embodiment, a first local wireless communications point 514 may be used by the local hub 502 to communicate with a remote hub 504. Further, a second local wireless communications point 510 may be used by the local hub 502 to communicate with one or more end user devices 518.

In another embodiment, the local hub may comprise a local wireless communications point that can be used to communicate with both a remote hub and end user devices. Further, in another embodiment, a local hub may use a plurality of wireless communication points to communicate with a plurality of devices and/or remote hubs using different wireless technologies. For example, a local hub may communicate with end user devices using Wi-Fi radio wave transmissions in accordance with the IEEE 802.11 standard (e.g., 802.11g). Additionally, the local hub may communicate using Bluetooth radio wave technology, thereby using a second wireless communications point. Also, the local hub may utilize Wi-Fi, WiMAX, or some other longer-range wireless communications, to communicate between the local and a remote hub.

It will be noted that the techniques and systems described herein are not limited to any particular form of wireless communications. It is anticipated that those skilled in the art may devise alternate techniques and systems for wireless communications. For example, a long-range radio transmission (e.g., short-wave radio) signal may be used to communicate with a plurality of hubs simultaneously in order to provide them with updated information.

At 106, in the exemplary method 100, the local hub provides for uploading and downloading of collaborative information by end user devices. For example, a series of hub devices can be deployed in an area after a natural disaster, where typical infrastructure availability is limited (e.g., electrical power, land-line phones, mobile phones, and Internet are lost). In one embodiment, as illustrated in the exemplary environment 500 of FIG. 5, respective hubs 502 and 504 can be activated to communicate wirelessly with end user devices 518. In another embodiment, an end user may plug a device into the local hub to access the uploading and downloading of information.

Respective hubs 502 and 504 can provide a service, for example, using a computing device 506 and 508 that allows an end user to upload their status to the hub 502 and 504 (e.g., that they are alive and located at their house with their family). Further, the end user can use their device to download information about other end users linked to the hub 502 and 504, and/or services that may be available in their area (e.g., water is going to be dropped off at a certain time and location). In this example, a localized network can be created in the area lacking infrastructure, connecting end user devices to a local hub.

At 108 the local hub wirelessly broadcasts a message, which comprises contact information for the local hub, so that a remote hub may contact the local hub to wirelessly retrieve collaborative information. In one embodiment, as illustrated in the exemplary embodiment 500 of FIG. 5, a local hub 502 may broadcast 520 contact information that comprises a protocol address for the local hub 502, such as an IP address, which a remote hub 504 can use to contact 520 the local hub 502. Further, in one embodiment, the local hub 502 can broadcast locator information, such as a uniform source locator (URL) for collaborative information feed, where the locator comprises an entry point for retrieving 520 the feed from the local hub 502. As an example, local hub may broadcast a message with their IP address and a list of URLs for respective information feeds stored on the hub, such as those that may be accessed through a web-server on the local hub. In this example, a remote hub in range of the broadcast may save the contact information (e.g., in a remote hub cache) and use it to retrieve collaborative information feed updates from the local hub.

At 110, in the exemplary method 100, collaborative information, such as information feeds, is synchronized between the local and remote hub. For example, a local hub may have broadcast contact information that was received by one or more remote hubs. In one embodiment, a synchronization timer may initiate synchronization of the collaborative information between the local and remote hubs. In another embodiment, a user or some other event may initiate the synchronization between the hubs.

At 112, synchronizing the collaborative information between the local and remote hub comprises having the local hub wirelessly retrieve a remote version of collaborative information (e.g., an information feed identified by its URL) from the remote hub, using contact information broadcast by the remote hub. For example, end users connected to a remote hub may create or update a collaborative information feed on the hub with new information, such as an updated neighborhood watch schedule that includes newly added people and areas. The local hub can begin synchronization of the feeds, in this example, by retrieving the newly updated feed from the remote hub using the remote hub's contact information.

At 114, synchronizing the collaborative information between the local and remote hub comprises having the local hub compare the remote version of the collaborative information with a locally stored version, if a local version is present. In one embodiment, a collaborative information feed that has been retrieved from a remote hub, such as one that comprises updated information about people that are still in a neighborhood after a natural disaster, may have a type of file marker that identifies when the feed was last changed and what was changed or added to the feed, for example. In this embodiment, the local hub can compare the marker from the remote feed with a local version of the feed stored on the local hub, if a local version is available, to determine if the remote feed is different (e.g., has been updated) from the local feed.

At 116, synchronizing of the collaborative information between the local and remote hub further comprises the local hub updating the local version of the collaborative information with differences between the remote version and the local version if it is determined that the remote version is a desired version (e.g., preferred over the local version due to more recent updates to the feed). In one embodiment, the local and remote versions of a feed are compared to determine which is the preferred version. For example, where a local version of a feed may comprise more recently updated information, the local version can be the preferred version. However, in this example, if the remote version comprises more recent information, it can be the preferred version. Where a conflict arises, for example, where both version have been recently updated, a desired version determination may be made based on an amount, type, and time of the updated information in the feed versions.

In another embodiment, a label or tag may be assigned to a version of a feed, which may allow it to be the desired version. For example, a new information update may be added by a user in an area and uploaded to a local hub, where the user wishes to ensure that other users of the wireless collaboration receive the updated information, such as a water delivery time and location. The user can tag the update so that it becomes a desired version and is thereby copied to other remote hubs. In these embodiments, the local hub can determine which version is the desired version and copy it to local storage (or keep its version if it is desired).

Figure 5:
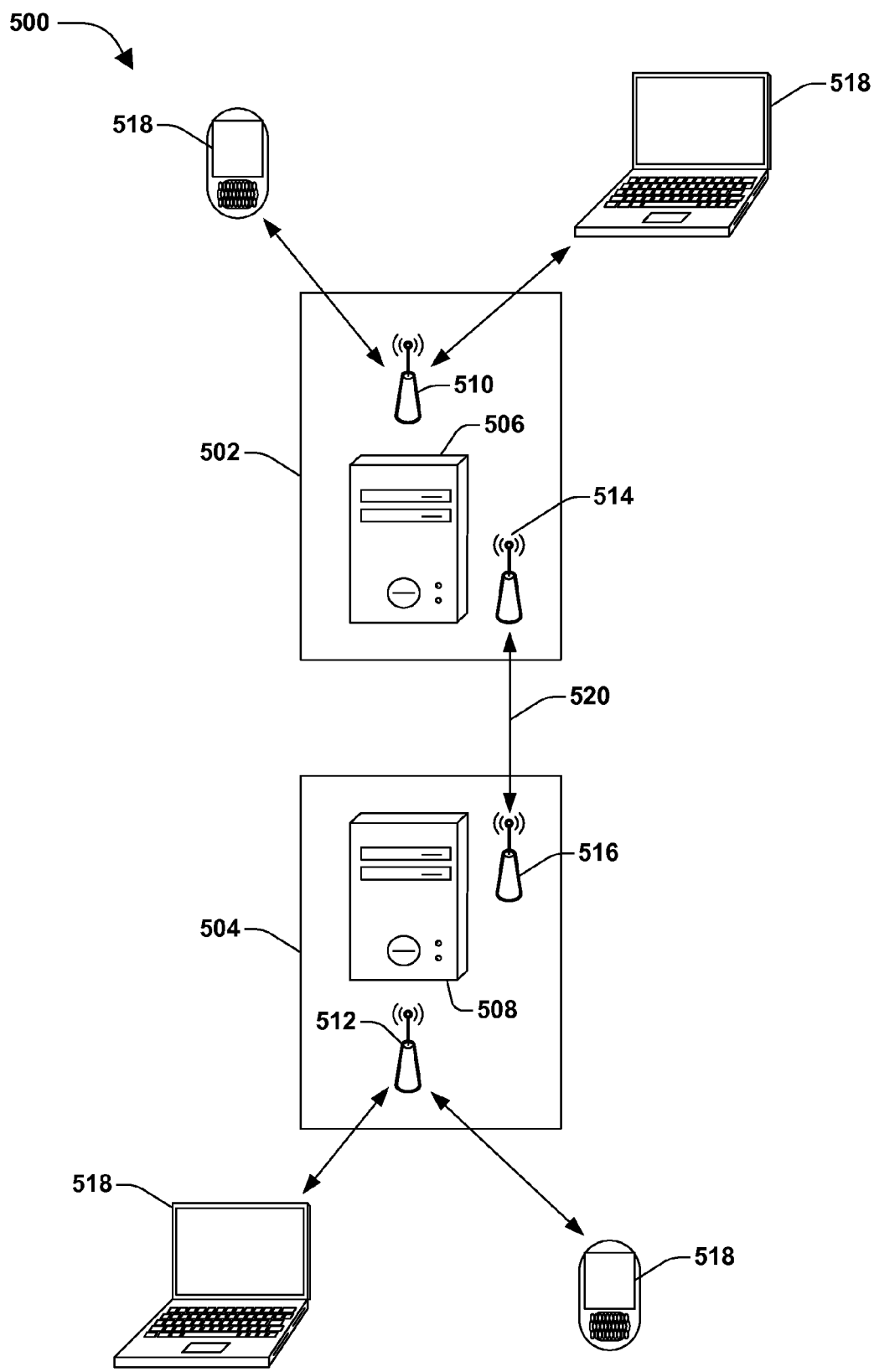
FIG. 5 is a diagram of an exemplary environment illustrating how some of the techniques and systems, described herein, may be utilized.

At 118, synchronizing of the collaborative information between the local and remote hub further comprises creating a local version of the remote collaborative information if a local version is not present. For example, if the local hub retrieves feeds from the remote hub using the contact information broadcast by the remote hub, and the local hub does not have a version of one or more of the remote feeds, the local hub can copy the one or more remote feeds to its local storage. In one embodiment, a user of an end user device, such as illustrated by 518 in FIG. 5, 500, is connected to a remote hub 504, and the user creates a new collaborative information feed.

As an example, in this embodiment, the end user may wish to start a neighborhood watch schedule, so they begin a feed that allows other end users to fill in times when they can participate. The end user can user their device 518 to connect to the remote hub 504, and create the feed on the hub's web-server located on a computing device 508 in hub 504. During synchronization, the local hub 502 can retrieve the newly created remote feed 520 using the contact information broadcast by the remote hub 504. The local hub 502 can store the new feed on local storage located on a local computing device 506. End users connected to the local hub 502 can retrieve the new feed from the local hub 502, allowing them to review the neighborhood watch schedule and upload changes to the schedule, which in-turn can be sent back to the remote hub 504 to be viewed by end users connected to that hub 504.

In one aspect, as an example, a series of hubs can be deployed in an area that has lost local infrastructure, such as electrical power, land-line phones, cell-phone communications, and Internet access. In this aspect, in one embodiment, a plurality of hubs can be may be allocated to an area (e.g., by a state or local disaster relief agency), and dropped off for set up by people still located in the area after a natural disaster.

Figure 2:
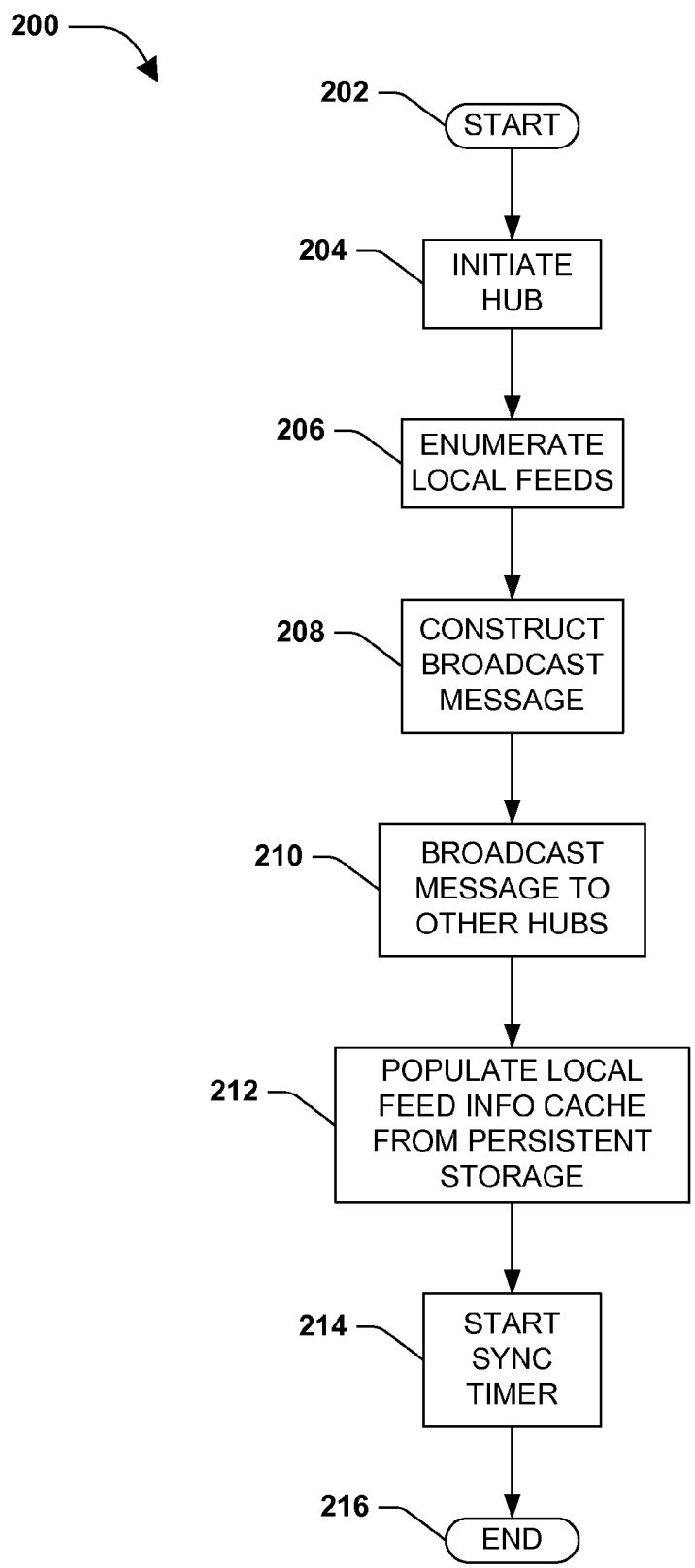
FIG. 2 is a flow diagram illustrating one embodiment of an exemplary portion of a method whereby hubs may be initiated.

In one embodiment, the hubs may be self contained units comprising an internal power source (e.g., rechargeable batteries) that merely need to be placed in an appropriate location and switched on. As an example, a plurality of hubs can be distributed throughout the area, connect with each other, thereby allowing end users in the area to connect with one another to share information locally and organize a neighborhood after a natural disaster. FIG. 2 is a flow diagram illustrating one embodiment 200 of an exemplary portion of a method whereby hubs may be initiated.

The exemplary embodiment 200 begins at 202 and involves initiating the hub, for example, by switching it on. In another embodiment, hubs may not comprise internal power sources or their batteries may be depleted; therefore the hubs may need to be connected to an external power source, such as a car battery, in order to be initiated. Once initiated, a hub can proceed through an start-up procedure that may merely proceed at initiation and will not be repeated unless the hub needs to be restarted for some reason.

At 206, information feeds that are stored locally on the hub are enumerated. In one embodiment, a hub that is deployed for a first time may comprise one or more pre-loaded information feeds to supply end-users with particular information. For example, the hub may comprise a feed that gives end users instructions on how to utilize the collaborative information network set up by the hubs. In this example, a pre-loaded end-user identification feed can be used by people in the area to identify who is still present in the neighborhood. Another pre-loaded feed may comprise a neighborhood watch setup schedule that end users can use to begin organizing a watch. A number of pre-loaded files may be used to help a neighborhood organize and communicate after an infrastructure failure, such as after a natural disaster.

At 208, a broadcast message can be constructed by the hub. As described above, a broadcast message can comprise the hub's contact information, such as an IP address, for remote hubs that have been deployed in the area to contact the local hub. Further, the broadcast message can comprise a list of locators, such as URLs, for local feeds that were enumerated for the hub. Therefore, as an example, the broadcast message may comprise an IP address of the hub and a list of URLs for the feeds (e.g., RSS or atom) concatenated at the end.

At 210, the message can be broadcast to other hubs that may have been deployed in the area. As an example, hubs may have been placed at locations in an area whereby respective hubs are within wireless communications range of at least one other hub. In this way, in this example, a string of hubs can be placed in an area that allow for desired coverage using a minimal number of hubs, so that respective hubs can pass information from one end of the string to the other. Therefore, when a plurality of hubs are deployed in area and initiated, for example, the respective hubs can broadcast a message that comprise their contact information and locators for feeds on the hubs.

At 212, a local feed information cache can be populated from persistent storage. In one embodiment, the local hub can comprise a local feed information cache, which stores information about collaborative information feeds stored in persistent storage on the local hub. For example, the local feed information cache may store merely a title and description for a local feed, such as a UUID and a string that describes what is contained in the feed. In this way, in this embodiment, the cache can comprise merely small amounts of information about local feeds in a format that can be standardized for respective hubs. Respective hubs can then merely store small amount of information about feeds that may be utilized in a collaborative network.

At 214, a synchronization timer can be started. In one embodiment, a synchronization timer may be used by a hub to determine when a next synchronization of information feeds between the local hub and a remote hub may be initiated. Therefore, for example, when the synchronization timer initiates a next synchronization the hub may again broadcast a message comprising feed information. After starting the synchronization timer the exemplary method ends at 216.

Figure 3:
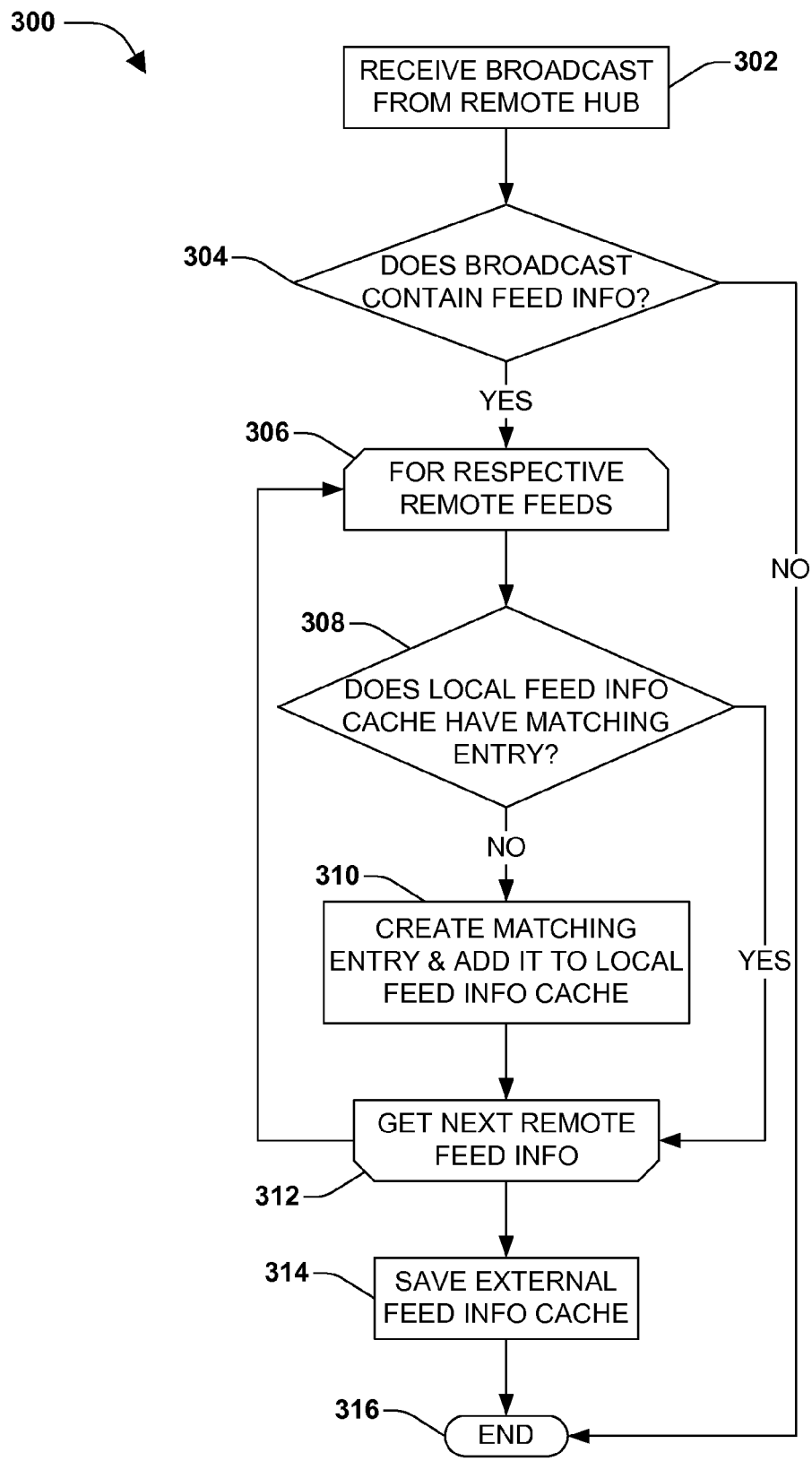
FIG. 3 is a flow diagram illustrating one embodiment of a portion of an exemplary method where remote information is stored on a local hub.

In another aspect, a local hub may detect a wireless broadcast from a remote hub. For example, when a remote hub is initialized, as described above, it puts together a message comprising contact information and locators for feeds located on the remote hub. In this aspect, the local hub can then save the information broadcast by the remote hub to a local external feed information cache. In one embodiment, this cache can then be stored in persistent memory on the local hub. FIG. 3 is a flow diagram illustrating one embodiment 300 of a portion of an exemplary method where remote information is stored on a local hub.

At 302, in the exemplary embodiment 300, a broadcast is received from a remote hub, such as when the remote hub is initiated. At 304, the local hub can review the message broadcast by the remote hub to determine whether it contains feed information. For example, if the remote hub does not have any information feeds stored thereon the message broadcast by the remote hub may merely comprise an IP address for the remote hub. If there is no feed information in the remote message the exemplary embodiment of the method ends at 316.

However, if the remote message comprises locator information for one or more collaborative information feeds concatenated with an address for the remote hub, at 306, the exemplary embodiment 300 of the method looks at the respective remote feeds, at 306. The local hub can review the remote feed information and compare it to information stored in a local feed information cache, at 308. For example, when an information feed is created a title and description can be created for the feed. A title may be some short descriptor for the feed, such as an ID, UUID, a string name, or other short string that can be used to identify the feed. Further, the title may be a string that is used in a URL for the feed, for example.

In one embodiment, titles of respective information feeds found on a local hub may be stored in a local feed information cache for the local hub. In this way, for example, the local hub can merely check a title of the remote feed against titles of feeds stored in the local feed information cache to determine whether a local version is present. At 312, if the local feed information cache comprises a matching entry for the remote feed, the next remote feed can be reviewed, if one is present, at 306.

However, if a matching entry for the remote feed is not found in the local feed information cache, at 308, a matching entry for the remote feed is created and added to the local feed information cache, at 310. After creating a local entry for the remote feed information for a next remote feed can be reviewed, at 312. In this embodiment 300, the 306 to 312 loop can be repeated for the respective remote feeds identified in the remote broadcast.

At 314, the information broadcast by the remote hub and received by the local hub is saved to an external feed info cache in the local hub. In one embodiment, the external feed info cache can be used by a local hub to store contact information for remote hubs within wireless range of the local hub, along with feed locators for information feeds located on the remote hubs. In one embodiment, the cached remote broadcast information can be saved to persistent storage, such as a hard drive disk, on the local hub. Having saved the remote feed information, the exemplary embodiment 300 of the method ends at 316.

In another aspect, hubs deployed in an area can synchronize collaborative information feeds located on the respective hubs. In one embodiment, collaborative information in the form of an RSS feed can be created by an end user connected to a local hub by the end user's device that is wirelessly enabled. The collaborative information feed may be, for example, a list of food stores that the end user has available for neighbors in need, created with an intent for other neighbors linked to the collaborative network to update the feed with a list of additional supplies available, thereby collaborating to create and update the information.

Figure 4:
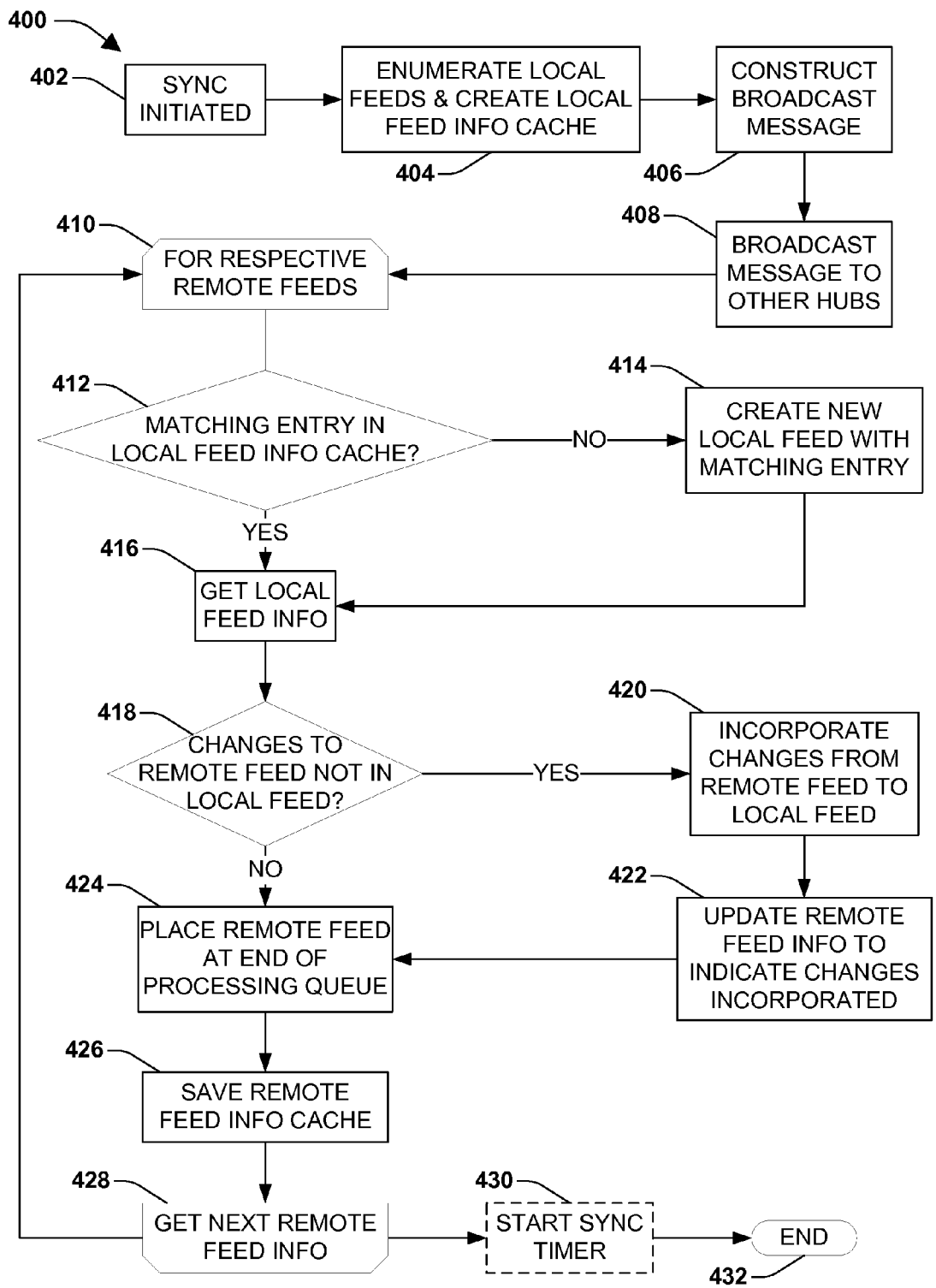
FIG. 4 is a flow diagram illustrating an exemplary embodiment of a portion of a method whereby collaborative information feeds can be synchronized between a local and remote hub.

FIG. 4 is a flow diagram illustrating an exemplary embodiment 400 of a portion of a method whereby collaborative information feeds can be synchronized between a local and remote hub. At 402, the synchronization is initiated. In one embodiment, the synchronization can be initiated by a synchronization timer, as described above in FIG. 2, 200. In another embodiment, the synchronization may be initiated by a user activating it, or some other event that triggers synchronization.

At 404, the local hub enumerates local feeds and creates a local feed information cache, as described in FIG. 2, 200. In this embodiment, for example, end users connected to the local hub may have created or updated information feeds and uploaded them to the local hub. In this example, the newly created feeds can be enumerated and the information that identifies the feeds can saved to the local information feed cache.

At 406, a broadcast message is constructed for the local feed, which can comprise contact information for the local hub, along with locator information for the local feeds. The message is broadcast from the local hub, at 408, and if a remote hub is within wireless communications range of the local hub's broadcast it can receive the broadcast. In this embodiment 400, respective remote hubs can also broadcast messages that comprise contact information and feed locators, which may be received by the local hub if it is within wireless range.

At 410, the respective feeds identified in the remote hubs' broadcasts are reviewed. The local hub determines whether its local feed information cache has a matching entry for the remote feed, at 412, as described above. If there is no matching information in the cache a new entry is created in the local cache, at 414. On the other hand, if the local cache already has the information for the remote feed, the local feed version information is retrieved from the local hubs storage, at 416.

At 418, the remote feed can be retrieved from the remote hub, for example, using the remote broadcast information stored in the external information feed hub, and is compared with the local feed. If there are changes to the remote feed that are not found in the local version of the feed those changes can be incorporated into the local feed version, at 420. For example, an end user connected to the remote feed can add information to the collaborative information feed in question and uploaded it to the remote hub. In this example, this updated information can be synchronized to the local feed version, thereby providing updated feeds to the end users connected to the local hub.

At 422, the remote feed can be updated to indicate that the changes found in the remote feed have been incorporated into the local feed. In one embodiment, a place marker can be used in the file that comprises the feed indicating that the changes have been incorporated. In this embodiment, for example, future synchronization may be facilitated as hubs can merely look for this place marker to indicate whether additional changes have been made, and/or if they have already been incorporated.

At 424, the remote feed is placed at an end of a processing queue for the synchronization. In this way, for example, the respective feeds identified during synchronization can be addressed. Further, for example, if information retrieval or processing for a particular feed times out due to some processing or retrieval error, the processing queue can move to a next feed instead of stalling at a frozen feed.

The information broadcast by the remote hub is saved to the remote feed information cache, such as contact information and feed locators, by the local hub, at 426. At 428, a next information feed for the particular remote hub broadcast is reviewed. In this embodiment 300, after the respective feeds are processed for the respective remote hubs that broadcast for the synchronization, a synchronization timer can be restarted if utilized. In this way, for example, if a synchronization timer is utilized, a next synchronization can be initiated when the timer reaches the desired time duration between synchronizations.

Having started the timer, the exemplary embodiment 400 of the method ends at 432.

Figure 6:
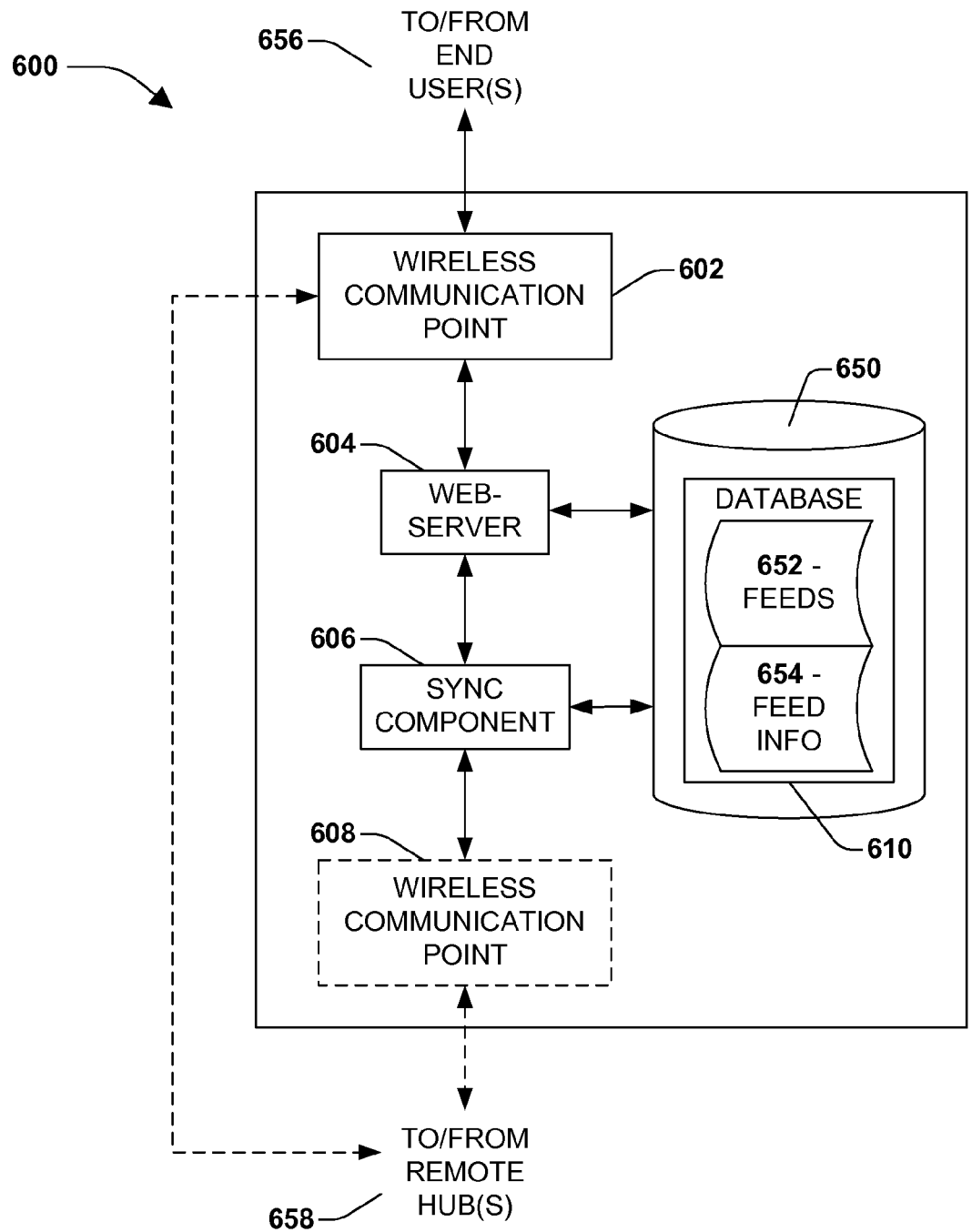
FIG. 6 is a component block diagram illustrating an exemplary system for creating and managing a mesh network configured to share collaborative information with end users.

A system may be devised for providing a localized collaboration of wireless communication enabled devices, independent of external communications, for sharing of information. FIG. 6 is a component block diagram illustrating an exemplary system 600 for creating and managing a mesh network configured to share collaborative information with end users. Using the exemplary system 600, end users may connect 656 to a local hub to upload, download, and collaborate on information, which in turn can be connected to remote hubs 658 to collaborate with other end users connected to remote hubs.

The exemplary system 600 comprises one or more wireless communications points 602 and 608 that are operably coupled to a local independent information hub (hub). The one or more wireless communications points 602 and 608 can be respectively configured to provide end user devices with wireless access to the local hub 656, and/or provide for wireless communications between the local hub and a remote hub 658. In one embodiment, a first wireless communications point 602, such as a wireless access point (WEP), can be used to connect end user devices that are wirelessly enabled to the local hub. In this embodiment, a second wireless communications point 608, such as a wireless node point (e.g., a WiMAX connection point), can be used to connect the local hub to a remote hub 658.

The exemplary system 600 further comprises a web-server component 604 that is operably coupled to the local hub. Further, the web-server component 604 is configured to run web applications that provide access to collaborative information feeds 652 from the local hub. In one embodiment, the collaborative information feeds 652 may comprise web-feeds (e.g., RSS or atom feeds) that are configured to provide end users with updated information content from a local hub. In this embodiment, for example, the updated information may be information uploaded to the hub by end users connected wirelessly to the hub, or connected to a remote hub.

The exemplary system 600 further comprises one or more local database components 610, which are operably coupled to the local hub, and are configured to provide for local hub storage of collaborative information feeds 652 and metadata for the collaborative information feeds 654. In one embodiment, a database 610 may utilize persistent storage 650 on the local hub to store web-feeds uploaded to the local hub by end users 656, and/or copied from remote hubs 658. The database 610 can also be used to organize and store a cache comprising information about local and remote feeds (e.g., contact and locator info for remote feeds).

The exemplary system 600 further comprises a synchronization component 606 that is operably coupled to the local hub, and is configured to synchronize collaborative information feeds 652 between the local hub and the remote hub 658. In one embodiment, a local hub can detect a remote hub's broadcast, which may comprise remote hub contact information and locators for feeds located on the remote hub. In this embodiment, for example, the synchronization component 606 can synchronize the remote hub's version of a feed with the local hub's version of the feed, thereby providing for updated collaborative information between hubs in a mesh network.

Figure 7:
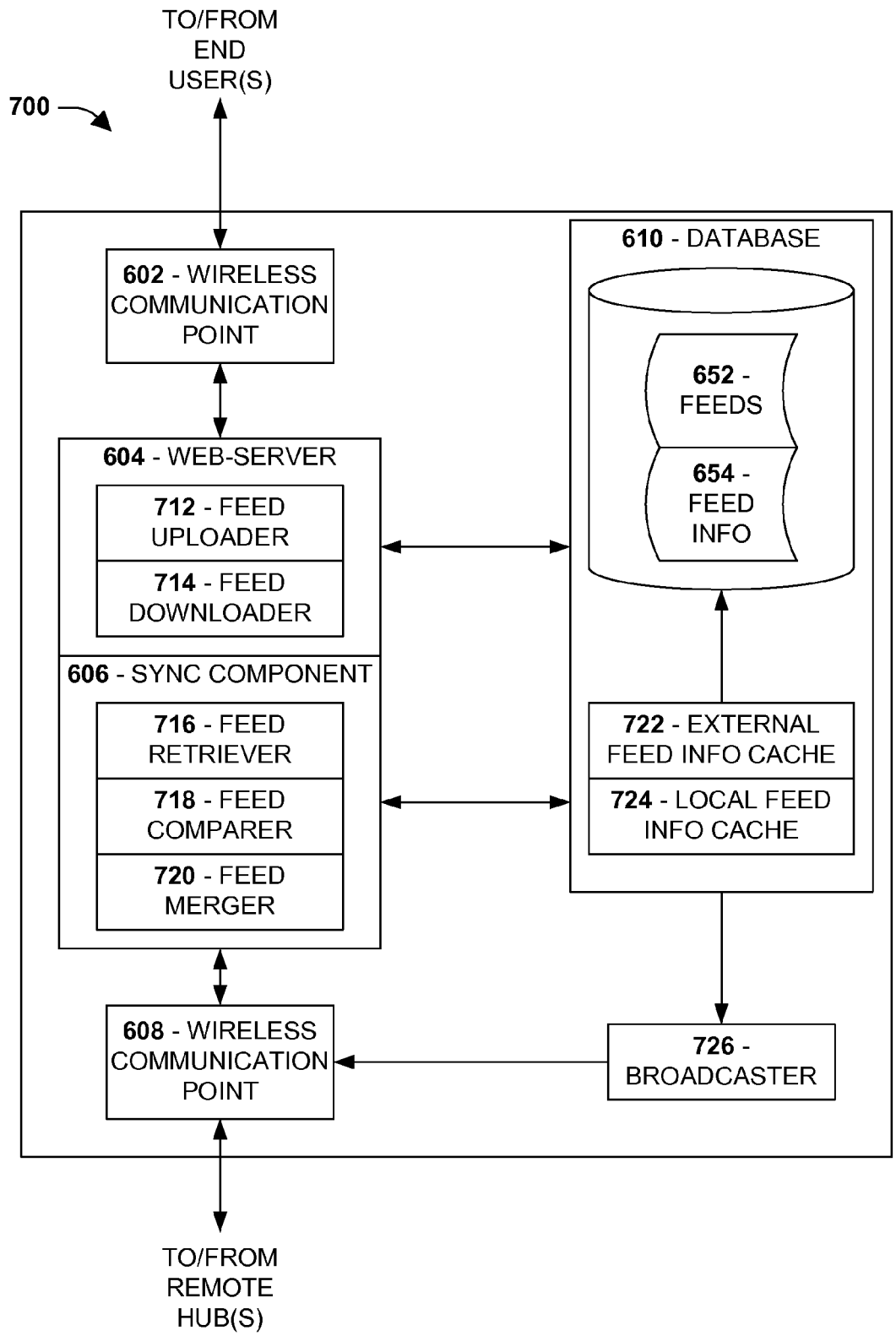
FIG. 7 is a component block diagram of one embodiment of a system where information may be uploaded to and downloaded from a local hub, and the local hub may connect with remote hubs to synchronize feeds between the hubs.

FIG. 7 is a component block diagram of one embodiment 700 of a system where information may be uploaded to and downloaded from a local hub, and the local hub may connect with remote hubs to synchronize feeds between the hubs. In this embodiment 700, the web-server component 604 comprises a collaborative information feed upload component 712 that can be configured to allow an end user to upload a new collaborative information feed 652 to the local hub, and/or upload an updated collaborative information feed 652 to the local hub. The web-server component 604 further comprises a collaborative information feed download component 714 that is configured to allow an end user to download an iteration collaborative information feed 652 from the local hub.

For example, an end user connected to the hub, using the wireless communication point 602 can access the web server 604. The end user may wish to download an iteration of an existing hub feed 652 to view or make changes to using the downloader component 714. Further, the end user may wish to upload a newly created feed or updated feed using the uploader component 712.

In this embodiment 700, the synchronization component 606 comprises a feed retrieval component 716, which is configured to issue a "get remote feed" command using an IP address for a corresponding remote hub and a locator for a collaboration information feed on the remote hub. The feed retrieval component 716 is further configured to retrieve the remote collaboration information feed from the remote hub. In this way, for example, remote information feeds can be retrieved from the remote hubs during synchronization between a local and remote hub.

The synchronization component 606 further comprises a feed comparison component 718 that is configured to compare a local version of the collaboration information feed 652 with the remote version of the collaboration information feed to identify differences between the versions. The feed comparison component 718 is further configured to determine which version of the collaboration information feed is a desired version. In one embodiment, where differences are identified between the local and remote version of a feed, the feed comparison component 718 can determine which version is desired, for example, based on an amount and type of changes, age of changes, and/or whether a place marker indicates a more preferred version.

Based on the determination by the feed comparison component 718, a feed merging component 720 in the synchronization component 606 can merge the local version of the collaboration information feed 652 with the remote version, if differences are identified and the remote version is the desired version. Therefore, if the local version of the feed 652 is desired it can remain unchanged, for example, whereas the remote version can be merged into the local version if the remote version is desired.

In the exemplary embodiment 700, the system further comprises an external feed information cache 722 that is configured to store a remote hub address, remote hub locator, and a feed descriptor for respective remote collaborative information feeds identified by the local hub. Therefore when a remote hub broadcasts contact information (e.g., a remote hub IP address) and locators (e.g., URLs on a remote web-server) for remote information feeds, the local hub can store this broadcast information in the external feed information cache 722, for example. In one embodiment, the cached remote information can be saved to persistent storage 654 using the local hub's database 610.

The exemplary embodiment 700 of the system further comprises a local feed info cache 724 that is configured to store a local feed locator and a local feed descriptor for respective local collaborative information feeds stored by the local hub. Therefore the local hub can retrieve the information stored in the local feed info cache 724 to construct a broadcast message sent out to remote hubs that may be within wireless communications range, for example. In one embodiment, the cached local information can be saved to persistent storage 654 using the local hub's database 610.

The exemplary embodiment 700 of the system further comprises a local hub contact information broadcasting component 726. This component can be configured to broadcast the local hub's IP address for communicating with the local hub, and a list of one or more URLs corresponding to local collaborative information feeds stored by the local hub, if present. For example, the local hub information stored 654 stored by the hub's database 610 can be used by the broadcasting component 726 to send a message using a wireless communications point 608. In one embodiment, if a remote hub is within wireless communications range of the broadcast, the information in the message may be used by the remote hub to contact the local hub to retrieve feed information, for example.

In another embodiment, the local hub can be configured to recognize when a remote hub is within range of wireless communications. Further the local hub can be configured to display a signal that identifies when the remote hub is within wireless communications range. For example, a plurality of hub devices may be dropped off in a neighborhood that has experienced loss of power and communications. Potential end users of the hubs may then place the hubs throughout the neighborhood in strategic locations to create a mesh communications network for the area. In this example, the local hub may display a green light that indicates the hub is within wireless communications range of another hub. When the hub is moved out of range the light can switch to red. In this way, in this example, the end users that are placing the devices can determine appropriate locations to place the hubs in the area.

Figure 8:
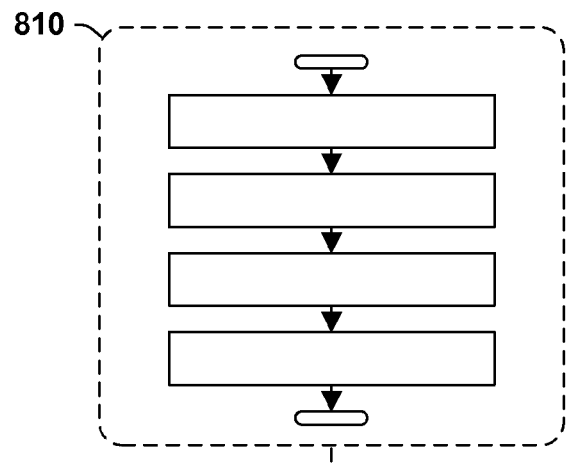
FIG. 8 is an illustration of an example computer-readable medium comprising processor-executable instructions configured to embody one or more of the provisions set forth herein.
Figure 8:
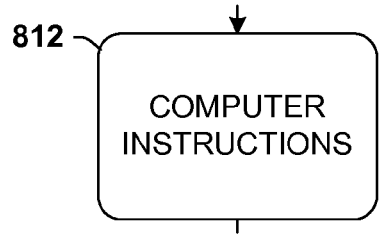
Figure 8:
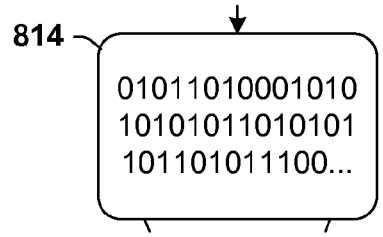
Figure 8:
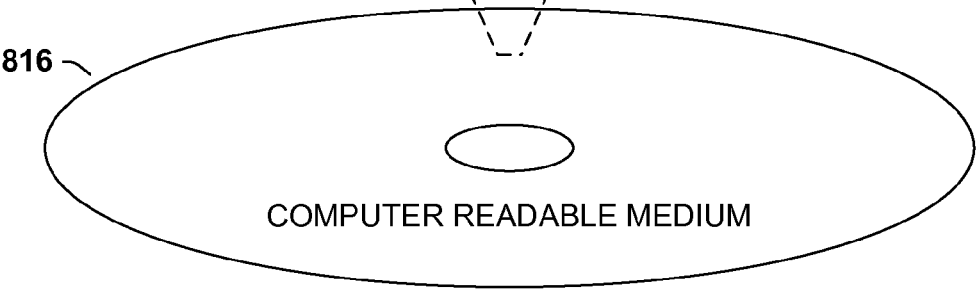

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as the exemplary method 100 of FIG. 1, for example. In another such embodiment, the processor-executable instructions 804 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
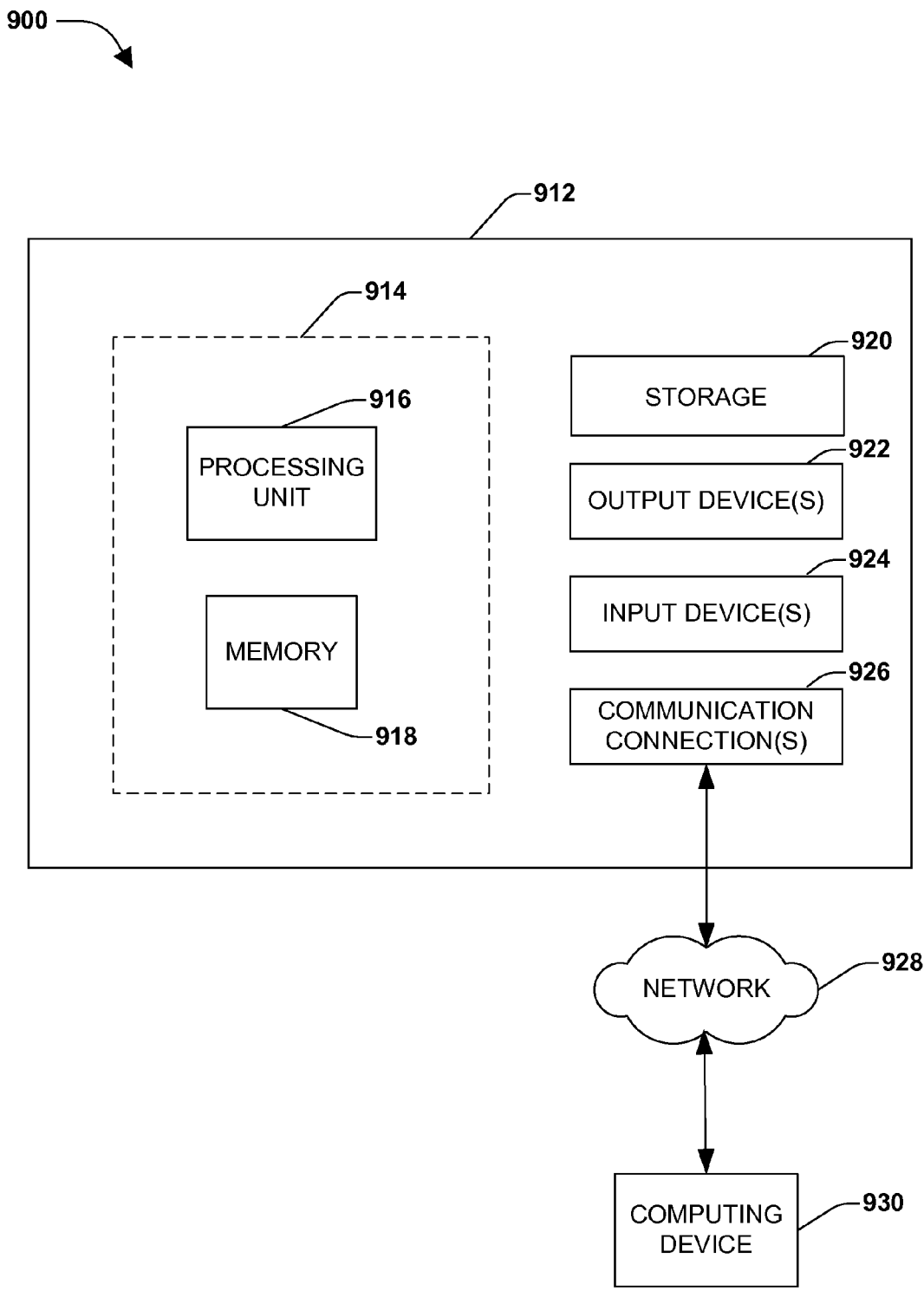
FIG. 9 illustrates an example computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
synchronizing collaborative information, associated with a collaborative information feed contributed to by an end user device, between a local hub not connected to the Internet and a remote hub not connected to the Internet, the collaborative information feed comprising at least one of:
a schedule for an organization of a neighborhood watch, comprising a time that a first user indicated the first user can participate and a time that a second user indicated the second user can participate;

a list of supplies, comprising food stores that a third user indicated the third user has available and additional supplies that a fourth user indicated the fourth user has available;

statuses, comprising a status and location of a fifth user indicated by the fifth user and a status and location of a sixth user indicated by the sixth user; or services, comprising a time and location that a first service will be available and a time and location that a second service will be available, the synchronizing comprising:

wirelessly retrieving a remote version of the collaborative information from the remote hub;

determining if the local hub comprises a locally stored version of the collaborative information; and creating a local version of the collaborative information from the remote version if the local hub does not comprise a locally stored version of the collaborative information;

wirelessly broadcasting contact information from the local hub to the remote hub, the contact information comprising:

a protocol address, configured to be used by the remote hub to contact the local hub, concatenated with a list of locators, comprising a first locator for the collaborative information feed and a second locator for a second feed; and wirelessly broadcasting, via a short-wave radio signal from the local hub to two or more remote hubs, at least one of at least some of a version of the collaborative information or the contact information.

2. The method of claim 1, the collaborative information feed comprising two or more of the schedule for the organization of the neighborhood watch, the list of supplies, the statuses or the services.

3. The method of claim 1, the collaborative information feed comprising three or more of the schedule for the organization of the neighborhood watch, the list of supplies, the statuses or the services.

4. The method of claim 1, the collaborative information feed comprising the schedule for the organization of the neighborhood watch, the list of supplies, the statuses and the services.

5. The method of claim 1, the collaborative information feed comprising both the schedule for the organization of the neighborhood watch and the list of supplies.

6. The method of claim 1, comprising:
detecting a wireless broadcast from the remote hub; and
saving information broadcast by the remote hub to a local external feed information cache.

7. The method of claim 6, comprising:
determining whether the wireless broadcast comprises a collaborative information feed locator; and
if the wireless broadcast comprises a collaborative information feed locator:
determining whether the local hub comprises a locally stored version of a second collaborative information feed corresponding to the collaborative information feed locator; and
if a locally stored version of the second collaborative information feed is not comprised in the local hub:
creating a local version of the second collaborative information feed; and
adding the local version of the second collaborative information feed to the local external feed information cache.

8. The method of claim 1, comprising:
enumerating a local collaborative information feed for the local hub;
constructing a message for the local hub, the message comprising a locator for the local collaborative information feed;
broadcasting the message; and
updating a local feed information cache with information for the local collaborative information feed.

9. The method of claim 8, the broadcasting the message performed upon initialization of the local hub.

10. The method of claim 8, the broadcasting the message performed upon reaching a desired timed interval point.

11. The method of claim 8, the broadcasting the message performed upon initiation by a user.

12. A system, comprising:
one or more processing units; and
memory comprising instructions that when executed by at least one of the one or more processing units perform a method, comprising:
synchronizing collaborative information, associated with a collaborative information feed contributed to by an end user device, between a local hub not connected to the Internet and a remote hub not connected to the Internet, the collaborative information feed comprising at least one of:
a schedule for an organization of a neighborhood watch, comprising a time that a first user indicated the first user can participate and a time that a second user indicated the second user can participate;
a list of supplies, comprising food stores that a third user indicated the third user has available and additional supplies that a fourth user indicated the fourth user has available;
statuses, comprising a status and location of a fifth user indicated by the fifth user and a status and location of a sixth user indicated by the sixth user; or
services, comprising a time and location that a first service will be available and a time and location that a second service will be available, the synchronizing comprising:
wirelessly retrieving a remote version of the collaborative information from the remote hub;
determining if the local hub comprises a locally stored version of the collaborative information; and
creating a local version of the collaborative information from the remote version if the local hub does not comprise a locally stored version of the collaborative information;
wirelessly broadcasting contact information from the local hub to the remote hub, the contact information comprising:
a protocol address configured to be used by the remote hub to contact the local hub, concatenated with a list of locators, comprising a first locator for the collaborative information feed and a second locator for a second feed; and
wirelessly broadcasting, via a short-wave radio signal from the local hub to two or more remote hubs, at least one of at least some of a version of the collaborative information or the contact information.

13. The system of claim 12, the local hub configured to display a signal that indicates when the remote hub is within a wireless communications range.

14. The system of claim 12, a first local wireless communications point used by the local hub to communicate with the remote hub based on at least one of Wi-Fi or WiMAX, a second local wireless communications point used by the local hub to communicate with the end user device based on Bluetooth.

15. The system of claim 12, the method comprising updating the locally stored version of the collaborative information based upon differences between the remote version and the locally stored version if the local hub does comprise a locally stored version of the collaborative information.

16. The system of claim 12, the method comprising providing one or more end user devices access to one or more collaborative information feeds from the local hub.

17. The system of claim 12, the wirelessly retrieving comprising:
issuing a get remote feed command using an Internet protocol (IP) address for the remote hub.

18. The system of claim 12, the method comprising:
storing, in an external feed information cache, a remote hub address, a remote hub locator, and a feed descriptor for the collaborative information feed.

19. The system of claim 12, the protocol address comprising an Internet protocol (IP) address, the first locator comprising a first uniform resource locator (URL), the second locator comprising a second URL.

20. A computer readable storage device comprising instructions that when executed perform a method comprising:
synchronizing collaborative information, associated with a collaborative information feed contributed to by an end user device, between a local hub not connected to the Internet and a remote hub not connected to the Internet, the collaborative information feed comprising at least one of:
a schedule for an organization of a neighborhood watch, comprising a time that a first user indicated the first user can participate and a time that a second user indicated the second user can participate;
a list of supplies, comprising food stores that a third user indicated the third user has available and additional supplies that a fourth user indicated the fourth user has available;
statuses, comprising a status and location of a fifth user indicated by the fifth user and a status and location of a sixth user indicated by the sixth user; or
services, comprising a time and location that a first service will be available and a time and location that a second service will be available, the synchronizing comprising:
wirelessly retrieving a remote version of the collaborative information from the remote hub;
determining if the local hub comprises a locally stored version of the collaborative information; and
creating a local version of the collaborative information from the remote version if the local hub does not comprise a locally stored version of the collaborative information;
wirelessly broadcasting contact information from the local hub to the remote hub, the contact information comprising:
a protocol address, configured to be used by the remote hub to contact the local hub, concatenated with a list of locators, comprising a first locator for the collaborative information feed and a second locator for a second feed; and
wirelessly broadcasting, via a short-wave radio signal from the local hub to two or more remote hubs, at least one of at least some of a version of the collaborative information or the contact information.

* * * * *